Patented Apr. 16, 1940

2,197,540

UNITED STATES PATENT OFFICE 2,197,540

METHOD OF PRODUCING REACTION PRODUCTS OF AMMONIA AND ALDOSE SUGARS

Eugene D. Klug, Wilmington, Del., assignor to Hercules Powder Company, Wilmington, Del., a corporation of Delaware No Drawing. Application October 15, 1938, Serial No. 235,279

13 Claims. (Cl. 260—211)

This invention relates to an improved method of producing reaction products of ammonia and aldoses.

It is well known in the art that an aldose sugar, such as for example, glucose, reacts with ammonia to give crystalline reaction products. These reaction products have been referred to as glucose ammonia, the aldehyde-ammonia of glucose, or as glucosimine, the condensation product formed with elimination of water.

The reaction of aldose sugars with ammonia as carried out according to procedures known to the art has either involved contacting the reactants at room temperature for long periods of time or heating at elevated temperatures for comparatively shorter periods, although still rather long for commercial utilization. A disadvantage of the prior art procedures involving heating at elevated temperatures has been the decomposition and degradation occurring at the elevated temperatures. The prior art procedures carried out at room temperature are too impractical to be inducive to commercial utilization.

Now, in accordance with this invention, I have discovered an improved process for preparing reaction products of aldose sugars containing five or more carbon atoms and ammonia which does not require the extended reaction time and which does not cause degradation of the aldose sugar or its reaction product with ammonia. Moreover, my improved process gives much higher yields of reaction product than obtainable by prior art procedures. My process is one which lends itself readily to commercial scale production.

According to my improved procedure the aldose sugar is heated in a substantially anhydrous condition with ammonia in the presence of an acid catalyst. The heating is carried out desirably at a temperature within the range of about 50° C. to about 90° C. By use of an acid catalyst and heating desirably within this range, I am able to prepare reaction products of aldose sugars and ammonia in much higher yields than heretofore possible and by procedures which are readily adaptable to economical commercial utilization.

The aldose sugars which I preferably utilize in the production of aldose-ammonia reaction products in accordance with this invention are those aldose sugars which contain five or more carbon atoms. Thus, for example, I may use aldopentoses such as xylose or arabinose; aldohexoses, such as glucose, mannose or galactose; dihexose saccharides having a functional aldehyde group, such as, lactose or maltose, etc.

The reaction of the aldose sugar with ammonia in accordance with this invention is carried out preferably with use of anhydrous ingredients. The ammonia may be introduced in the form of liquid ammonia or as gaseous ammonia. The reaction may be carried out in the presence of anhydrous methyl alcohol as a solvent. With use of the solvent the gaseous ammonia may desirably be passed into the cooled mixture of the aldose sugar and alcohol. Alternatively, liquid ammonia may be added to the mixture of the aldose sugar and alcohol. The reaction is preferably carried out under an ammonia pressure of at least 100 lbs. per sq. inch.

As catalysts for the reaction of aldose sugars with ammonia, I have found inorganic or organic acids to be very effective. Thus, I have found that acids such as hydrochloric, acetic, monochloracetic, trichloracetic, benzoic, citric and tartaric acids accelerate the reaction very perceptibly.

The amount of acid catalyst which may be used does not appear to be critical above about one-half of one per cent. I have found that from about one-half to about five per cent and preferably about one to two per cent of catalyst by weight based on the aldose sugar is satisfactory. Since such acid catalysts form ammonium salts of the acids in the process, the ammonium salt of an inorganic or organic acid, such as those described above, may be used in place of the acid. Above about five per cent of acid catalyst is not desirable since it contaminates the product.

In carrying out my improved method of producing reaction products of aldose sugars containing at least 5 carbon atoms and ammonia, the aldose sugar in a substantially anhydrous condition is heated with anhydrous ammonia in the presence of an acid catalyst, the heating being carried out desirably at a temperature within the range of about 50° C. to about 90° C. The reaction is carried out preferably in a suitable pressure vessel, such as an autoclave, so that it may proceed in the presence of an excess of ammonia under superatmospheric pressure. When the reaction is carried out in the presence of anhydrous methyl alcohol it is desirable to have sufficient ammonia present to exert a vapor pressure of at least 100 pounds per square inch at the reaction temperature. The mixture may be cooled to a low temperature, such as, for example, about —40° C. and saturated with gaseous ammonia. Alternatively, liquid ammonia may be added to the cooled mixture. It is not necessary to cool the mixture, however, before introducing the ammonia since the liquid ammonia may be pumped into the autoclave under pressure.

The mother liquor resulting from the reaction after separation of the crystalline reaction product contains an additional amount of the reaction product in solution. The mother liquor may be concentrated, cooled, or treated in any desirable manner to recover additional reaction product. The mother liquor may be used over again as the solvent for a fresh lot of sugar, and this process repeated over and over again, thereby minimizing the loss of product in the mother liquor. The following examples will serve to illustrate the various embodiments of my improved procedure for preparing reaction products of aldose sugars and ammonia.

*Example 1*

One hundred and fifty parts by weight of anhydrous glucose and 1.5 parts by weight of citric acid were placed in an autoclave. After cooling to below −40° C., 61 parts by weight of liquid ammonia were added. The autoclave was then sealed and heated with simultaneous agitation to about 60° C. in 1 hour, and maintained at that temperature for about 2 hours with agitation. The ammonia was then allowed to escape slowly. The product was a yellow solid. For purification it was triturated with anhydrous ethyl alcohol, yielding 103 parts by weight of white crystalline glucose-ammonia reaction product having a nitrogen content of 7.2%.

*Example 2*

One hundred parts by weight of lactose and 1 part by weight of citric acid were placed in an autoclave and then cooled to below −40° C. and 61 parts by weight of liquid ammonia were then added. The autoclave was sealed and heated with simultaneous agitation to about 60° C. in about 1 hour, and held at that temperature for about three hours with agitation. The product was a sticky yellow mass. After trituration with anhydrous ethyl alcohol, 77 parts by weight of white crystalline product were obtained, having a nitrogen content of 4.1%. The theoretical nitrogen content of the aldehyde-ammonia of lactose is 3.9%.

*Example 3*

Fifty parts by weight of xylose, 0.5 part by weight of glacial acetic acid and 120 parts by weight of methyl alcohol were placed in a stainless steel autoclave. After cooling to below −40° C., 92 parts by weight of liquid ammonia were added. After sealing the autoclave, it was heated to a temperature of about 60° C. to 70° C. After heating at that temperature for about 4½ hours, the pressure was released and the autoclave quickly cooled. The mother liquor was allowed to stand at about 4° C. for about 15 hours. The white crystalline solid separating was filtered off from the mother liquor. It amounted to about 31 parts by weight, and had a nitrogen content of 9.1%. The theoretical nitrogen content of xylosimine is 9.4%.

*Example 4*

Two hundred and fifty parts by weight of anhydrous glucose, 2.5 parts by weight of ammonium chloride and 600 parts by weight of anhydrous methyl alcohol were placed in an autoclave equipped with a mechanical stirrer. The contents of the autoclave were cooled to below −10° C. and ammonia gas passed in with agitation for about 1 hour. The autoclave was then sealed and heated to a temperature of about 72° C. in about 1 hour and maintained at that temperature for about 3 hours. The pressure was about 460 lbs. per sq. in. After releasing the pressure, the autoclave was opened. The product was a crystalline mush and yielded on trituration with anhydrous ethyl alcohol about 132 parts by weight of a white crystalline reaction product having a nitrogen content of 7.4%.

The mother liquor resulting from the above preparation was used as the solvent for a second reaction. Thus, 250 parts by weight of anhydrous glucose, 2.5 parts by weight of ammonium chloride and 750 parts by weight of the mother liquor were treated in the same manner as above. The yield of crystalline product from the second reaction was 170 parts by weight, having a nitrogen content of 7.2%.

*Example 5*

Two hundred and fifty parts by weight of anhydrous glucose, 2.5 parts by weight of citric acid and 600 parts by weight of anhydrous methyl alcohol were placed in an autoclave equipped with a mechanical stirrer. The contents of the autoclave were cooled to below −10° C. and ammonia gas passed in for about 1 hour with agitation. The autoclave was then sealed and heated to about 72° C. in about ½ hour with intermittent agitation. The temperature was maintained at 72° C. to 75° C. for about 3½ hours, with a pressure of about 190 to 200 lbs. per sq. in. After releasing the pressure the autoclave was opened. The product was a crystalline mush. The crystals were filtered off from the mother liquor, washed with cold methyl alcohol and dried in vacuum over calcium chloride. The yield was 146 parts by weight of white crystalline material having a nitrogen content of 7.2%.

*Example 6*

Two hundred parts by weight of lactose, 2.5 parts by weight of citric acid and 600 parts by weight of methyl alcohol were placed in an autoclave equipped with a mechanical stirrer. The contents of the autoclave were cooled to below −40° C. and ammonia gas passed in for about 1 hour. The autoclave was then sealed and heated to a temperature of 71° C. in about 2 hours, and maintained at a temperature of 71° to 74° for about 3 hours. The pressure increased to a maximum of 140 lbs. per sq. in., and then dropped off to a final pressure of 65 lbs. per sq. in. After releasing the pressure and opening the autoclave, a reddish mother liquor containing white crystals was obtained. The crystals were filtered off, washed, and dried. The yield of white crystalline material was 188 parts by weight, having a nitrogen content of 3.8%.

It will be appreciated that the details set forth in the above description and examples are included for purposes of illustrating my invention and are to be construed as limiting the broad features of the invention only within the limitations of the claims attached.

What I claim and desire to protect by Letters Patent is:

1. The method of producing a reaction product of an aldose sugar containing at least five carbon atoms and ammonia which includes contacting the aldose sugar in a substantially anhydrous condition with an excess of anhydrous ammonia and a suitable catalyst selected from the group consisting of an acid and an ammonium salt thereof.

2. The method of producing a reaction product of an aldose sugar containing at least five carbon atoms and ammonia which includes contacting the aldose sugar in the presence of anhydrous methyl alcohol with an excess of anhydrous ammonia and a suitable catalyst selected from the group consisting of an acid and an ammonium salt thereof.

3. The method of producing a reaction product of an aldose sugar containing at least five carbon atoms and ammonia which includes contacting the aldose sugar in a substantially anhydrous condition with an excess of anhydrous ammonia and a suitable catalyst selected from the group consisting of an acid and an ammonium salt thereof at a temperature within the range of about 50° C. to about 90° C.

4. The method of producing a reaction product of an aldose sugar containing at least five carbon atoms and ammonia which includes contacting the aldose sugar in the presence of anhydrous methyl alcohol with an excess of anhydrous ammonia and a suitable catalyst selected from the group consisting of an acid and an ammonium salt thereof at a temperature within the range of about 50° C. to about 90° C.

5. The method of producing a reaction product of an aldopentose and ammonia which includes contacting the aldopentose in a substantially anhydrous condition with an excess of anhydrous ammonia and a suitable catalyst selected from the group consisting of an acid and an ammonium salt thereof at a temperature within the range of about 50° C. to about 90° C.

6. The method of producing a reaction product of an aldohexose and ammonia which includes contacting the aldohexose in a substantially anhydrous condition with an excess of anhydrous ammonia and a suitable catalyst selected from the group consisting of an acid and an ammonium salt thereof at a temperature within the range of about 50° C. to about 90° C.

7. The method of producing a reaction product of a dihexose saccharide having a functional aldehyde group and ammonia which includes contacting the dihexose saccharide in a substantially anhydrous condition with an excess of anhydrous ammonia and a suitable catalyst selected from the group consisting of an acid and an ammonium salt thereof at a temperature within the range of about 50° C. to about 90° C.

8. The method of producing a reaction product of an aldopentose and ammonia which includes contacting the aldopentose in the presence of anhydrous methyl alcohol with an excess of anhydrous ammonia and a suitable catalyst selected from the group consisting of an acid and an ammonium salt thereof at a temperature within the range of about 50° C. to about 90° C.

9. The method of producing a reaction product of an aldohexose and ammonia which includes contacting the aldohexose in the presence of anhydrous methyl alcohol with an excess of anhydrous ammonia and a suitable catalyst selected from the group consisting of an acid and an ammonium salt thereof at a temperature within the range of about 50° C. to about 90° C.

10. The method of producing a reaction product of a dihexose saccharide having a functional aldehyde group and ammonia which includes contacting the dihexose saccharide in the presence of anhydrous methyl alcohol with an excess of anhydrous ammonia and a suitable catalyst selected from the group consisting of an acid and an ammonium salt thereof at a temperature within the range of about 50° C. to about 90° C.

11. The method of producing a reaction product of xylose and ammonia which includes contacting xylose in a substantially anhydrous condition with an excess of anhydrous ammonia and ½ to 5% by weight, based on the weight of xylose, of a suitable catalyst selected from the group consisting of an acid and an ammonium salt thereof at a temperature within the range of about 50° C. to about 90° C.

12. The method of producing a reaction product of glucose and ammonia which includes contacting glucose in a substantially anhydrous condition with an excess of anhydrous ammonia and ½ to 5% by weight, based on the weight of glucose, of a suitable catalyst selected from the group consisting of an acid and an ammonium salt thereof at a temperature within the range of about 50° C. to about 90° C.

13. The method of producing a reaction product of lactose and ammonia which includes contacting lactose in a substantially anhydrous condition with an excess of anhydrous ammonia and ½ to 5% by weight, based on the weight of lactose, of a suitable catalyst selected from the group consisting of an acid and an ammonium salt thereof at a temperature within the range of about 50° C. to about 90° C.

EUGENE D. KLUG.